(12) United States Patent
Wolkersdorfer et al.

(10) Patent No.: US 7,249,797 B2
(45) Date of Patent: Jul. 31, 2007

(54) REAR BODY STRUCTURE FOR A MOTOR VEHICLE

(75) Inventors: Werner Wolkersdorfer, Gartenstrasse (DE); Terrence Tattersall, Rochester Hills, MI (US)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 177 days.

(21) Appl. No.: 11/165,238

(22) Filed: Jun. 24, 2005

(65) Prior Publication Data

US 2006/0290173 A1  Dec. 28, 2006

(51) Int. Cl.
*B62D 25/08* (2006.01)
*B60J 5/10* (2006.01)

(52) U.S. Cl. ............... 296/203.04; 296/30; 296/146.8

(58) Field of Classification Search ............... 296/29, 296/30, 56, 146.8, 203.04
See application file for complete search history.

(56) References Cited

U.S. PATENT DOCUMENTS

| | | | | |
|---|---|---|---|---|
| 4,634,173 A | * | 1/1987 | Aonuma et al. | 296/203.04 |
| 4,775,181 A | * | 10/1988 | Shoda | 296/203.04 |
| 5,855,407 A | * | 1/1999 | Fukuda | 296/203.03 |
| 6,126,232 A | * | 10/2000 | Nakano | 296/210 |
| 6,789,837 B2 | * | 9/2004 | Mitsui et al. | 296/146.8 |
| 2004/0124671 A1 | * | 7/2004 | Roehl | 296/203.04 |
| 2006/0290173 A1 | * | 12/2006 | Wolkersdorfer et al. | 296/210 |

FOREIGN PATENT DOCUMENTS

| | | | | |
|---|---|---|---|---|
| DE | 19515979 | | 11/1995 | |
| JP | 02249771 A | * | 10/1990 | 296/203.01 |
| JP | 03136979 A | * | 6/1991 | 296/203.01 |
| JP | 04081367 A | * | 3/1992 | 296/203.01 |
| JP | 07186728 A | * | 7/1995 | 296/203.01 |

* cited by examiner

*Primary Examiner*—D. Glenn Dayoan
*Assistant Examiner*—Paul Chenevert
(74) *Attorney, Agent, or Firm*—Crowell & Moring LLP

(57) ABSTRACT

A rearward body structure of a motor vehicle has a vehicle body shell cutout for a tailgate attached to the body structure. The body structure has a roof junction assembly in which a lateral roof side member, a transversely extending roof frame with a hinge connection for the tailgate and a rear column converge, the roof side member the roof frame and the column respectively in a sheet metal shell construction having at least an exterior wall and an interior wall. The roof junction assembly also has an interior side part with a roof side member extension, a roof frame extension as well as a column extension, which roof side member extension and column extension each form the respective interior wall, on which roof frame extension a hinge reinforcement of the hinge connection is fastened. In order to provide the rearward body structure with sufficient stiffness, it is provided that the roof frame extension of the interior side part forms a section of the exterior wall of the transversely extending roof frame, in that the hinge reinforcement is fastened to an interior surface of the roof frame extension and in that an interior roof frame part forms the interior wall of the roof frame.

15 Claims, 3 Drawing Sheets

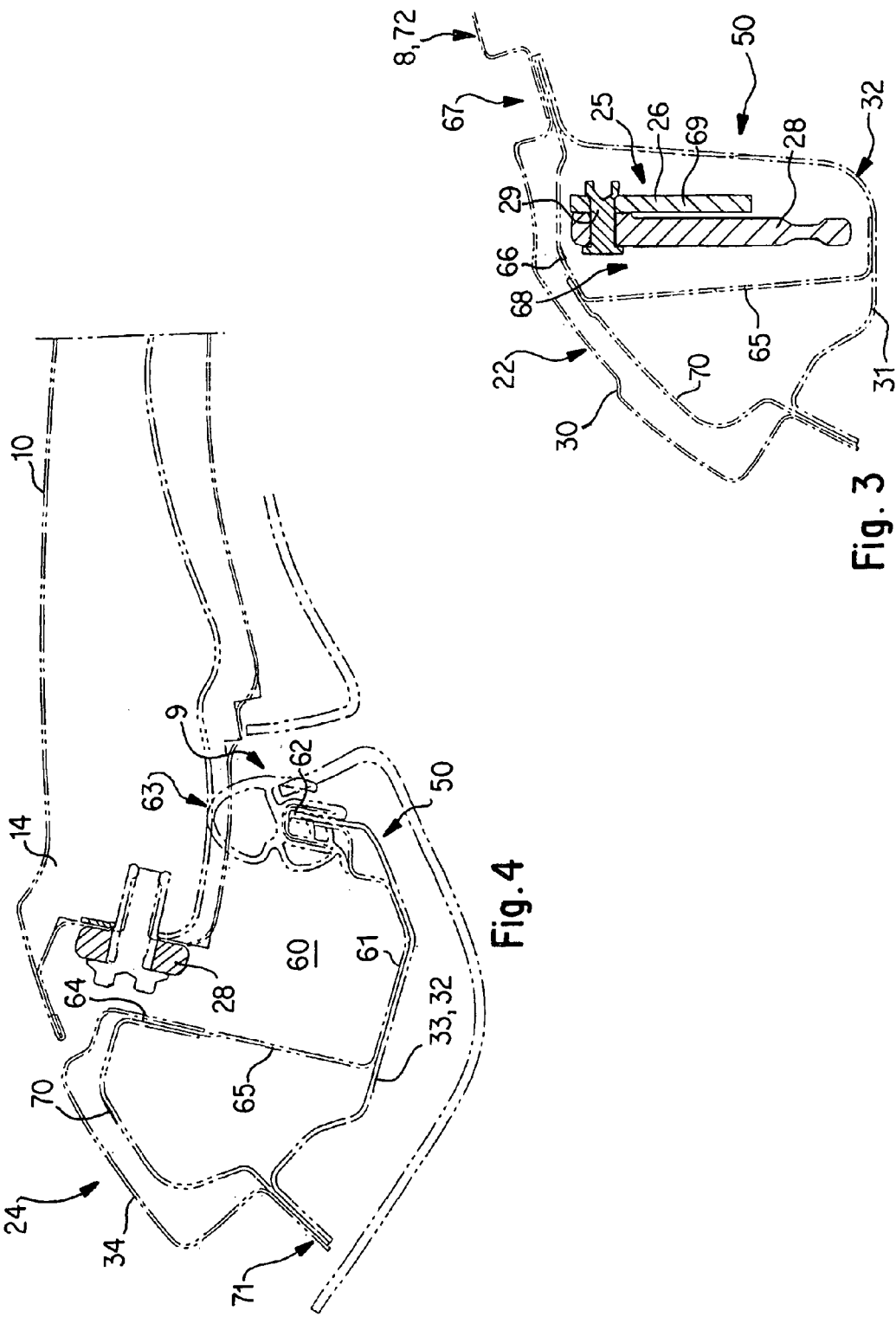

REAR BODY STRUCTURE FOR A MOTOR VEHICLE

BACKGROUND AND SUMMARY OF THE INVENTION

The invention relates to a rearward body structure of a motor vehicle. Certain preferred embodiments of the invention relate to rearward body structure of a motor vehicle, having a vehicle body shell cutout for a tailgate attached to the body structure, which body structure has a roof junction assembly in which a lateral roof side member, a transversely extending roof frame with a hinge connection for the tailgate and a rear column converge, the roof side member, the roof frame and the column respectively having a sheet metal shell construction with at least an exterior wall and an interior wall, said roof junction assembly further having an interior side part with a roof side member extension, a roof frame extension, and a column extension, which roof side member extension and column extension each form the respective interior wall, on which roof frame extension a hinge reinforcement of the hinge connection is fastened.

A rearward body structure of a motor vehicle of the initially mentioned type is known from German Patent Document DE 195 15 979 C2 and corresponding U.S. Pat. No. 6,126,232. The motor vehicle has a body shell cutout for a tailgate which is attached to the body structure by way of a hinge. The body structure itself comprises at least one roof junction in which a lateral roof side member, a transversely extending roof frame and a rear column, here, the D-column, converge. The transversely extending roof frame is situated between two mutually opposite roof junctions and, in addition, in each case, has a hinge connection for the tail gate, which hinge connection is situated close to the roof junctions. Here, the hinge connection is constructed in the form of a mounting surface for a fitting of the tailgate hinge. The roof side member, the roof frame and the rear column are each implemented in a sheet metal shell construction and have at least an exterior wall and an interior wall. The interior wall faces the luggage space or vehicle interior situated below the tailgate. The exterior wall is correspondingly situated above it and may form a portion of the vehicle skin, for example, in the case of the rear column or in the case of the roof side member. The exterior wall of the transversely extending roof frame is covered by a roof plate which is part of the vehicle skin. The roof junction has an interior side part with a roof side member extension, a roof frame extension as well as a column extension, and can, for example, have a T-shaped construction. The interior walls of the roof side member and of the rear column are formed by the corresponding roof side member extension or column extension of the interior side part. The roof frame extension is adjoined by a hinge reinforcement which is connected with the roof frame extension only in one connection section in an overlapping manner.

It is an object of the invention to provide a rearward body structure of the initially mentioned type which has a simple construction.

This object is achieved according to certain preferred embodiments of the invention by providing a rearward body structure of a motor vehicle, having a vehicle body shell cutout for a tailgate attached to the body structure, which body structure has a roof junction assembly in which a lateral roof side member, a transversely extending roof frame with a hinge connection for the tailgate and a rear column converge, the roof side member, the roof frame and the column respectively having a sheet metal shell construction with at least an exterior wall and an interior wall, said roof junction assembly further having an interior side part with a roof side member extension, a roof frame extension, and a column extension, which roof side member extension and column extension each form the respective interior wall, on which roof frame extension a hinge reinforcement of the hinge connection is fastened, wherein the roof frame extension of the interior side part forms a section of the exterior wall of the transversely extending roof frame, wherein the hinge reinforcement is fastened to an interior surface of the roof frame extension, and wherein an interior roof frame part forms the interior wall of the roof frame.

Important advantages achieved by means of the invention are that, while the construction of the structure is simple, a sufficient stiffness is achieved in the area of the roof junction, particularly for the fastening of the tailgate hinge. In particular, the hinge reinforcement can be fastened on the interior surface of the roof frame extension simply by being placed on it. On the whole, the rearward body structure in the area of the roof junction is distinguished by a comparatively small number of sheet metal parts which nevertheless provide the roof junction with a sufficient stiffness.

The stiffness of the rearward body structure is further optimized or its composition is further simplified by means of features described herein and in the claims. For example, a closing part of the transversely extending roof frame can be fastened after the hinge reinforcement was mounted on the interior side part.

Other objects, advantages and novel features of the present invention will become apparent from the following detailed description of the invention when considered in conjunction with the accompanying drawings.

BRIEF DESCRIPTION OF THE DRAWINGS

FIGS. 3 and 4 are sectional views respectively of the rearward body structure along Lines III-III or IV-IV in FIG. 1.

DETAILED DESCRIPTION OF THE DRAWINGS

Figure 1:
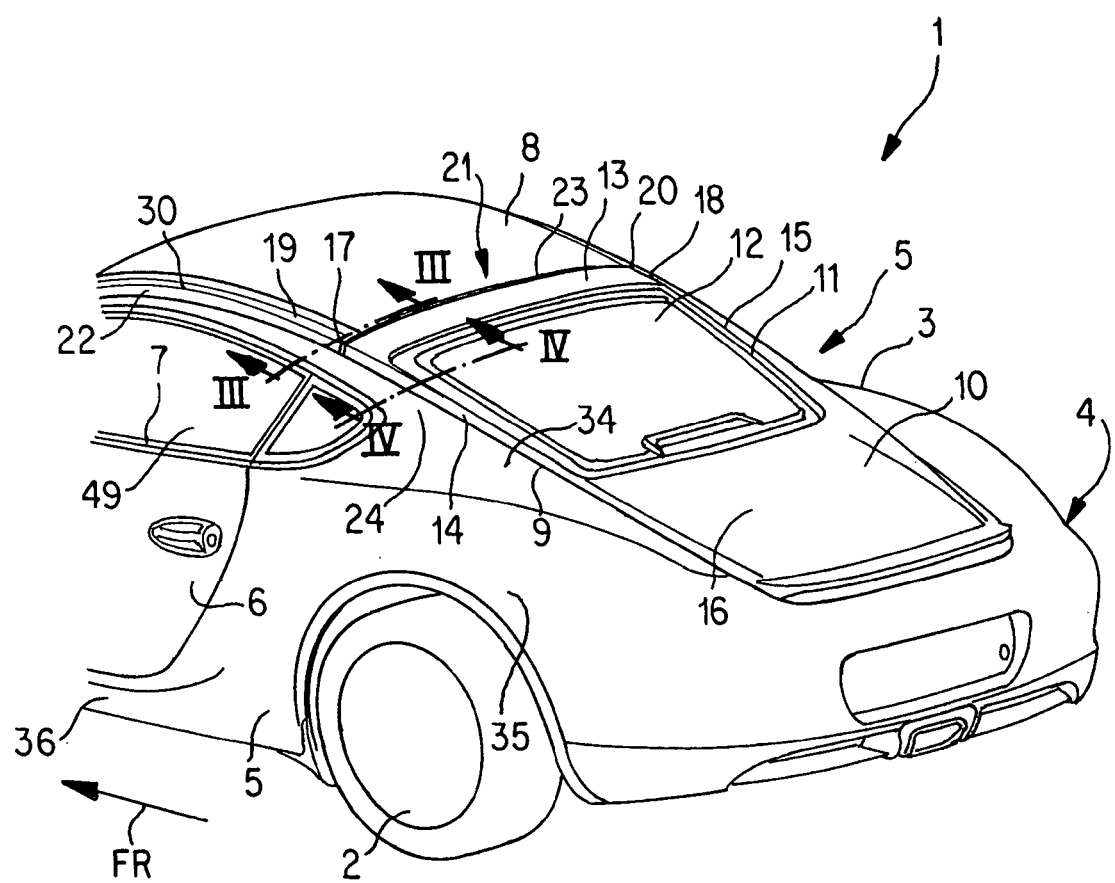
FIG. 1 is a perspective cutout-type view of a motor vehicle, constructed according to a preferred embodiment of the present invention.

FIG. 1 is a lateral rear view of a motor vehicle 1 which comprises a vehicle body which is carried by wheels 2 and has a body shell 3. The body shell 3 comprises a rear part 4; left and right side walls 5 which are arranged in front of the rear part 4—viewed in the forward driving direction FR—and into which doors 6 are inserted; and a roof 8 above a belt line 7. A body shell cutout 9 is bounded by the roof 8, the two side walls 5 as well as the rear part 4. A tailgate 10 is inserted into the vehicle body cutout 9. This tailgate 10 has an approximately rectangular window pane cutout 11 adjacent to the roof 8 into which a rear window pane 12 is inserted. The rear window pane 12 is therefore framed by an upper frame part 13, two lateral frame parts 14 and 15 and a rearward fixed tailgate section 16. Upper rear areas 17 and 18 of the vehicle body cutout 9 for the tailgate 10 are in each case situated adjacent to one roof junction 19 and 20 respectively of a rearward vehicle body structure 21 of the vehicle body shell 3.

In the following, the left roof junction 19 will be explained in detail; the right roof junction 20 has a corresponding mirror-inverted implementation. A lateral roof side member 22, a transversely extending rearward roof frame 23 and a rear column 24, here a C-column, converge in the roof junction 19. The tailgate 10 is connected to the rearward roof frame 23 by means of a hinge device 25 illustrated in FIG. 2. The hinge device 25 comprises a body-side fitting part 26 which is fastened to a hinge connection 27 on the rearward roof frame 23. A tailgate-side fitting part 28 of the hinge device 25 is fastened to the lateral frame part 14 of the tailgate 10, as illustrated in FIG. 4. The two fitting parts 26 and 28 are swivellably connected with one another in a hinge axis 29. In addition, FIG. 3 is a sectional view of the hinge device 25.

Figure 2:
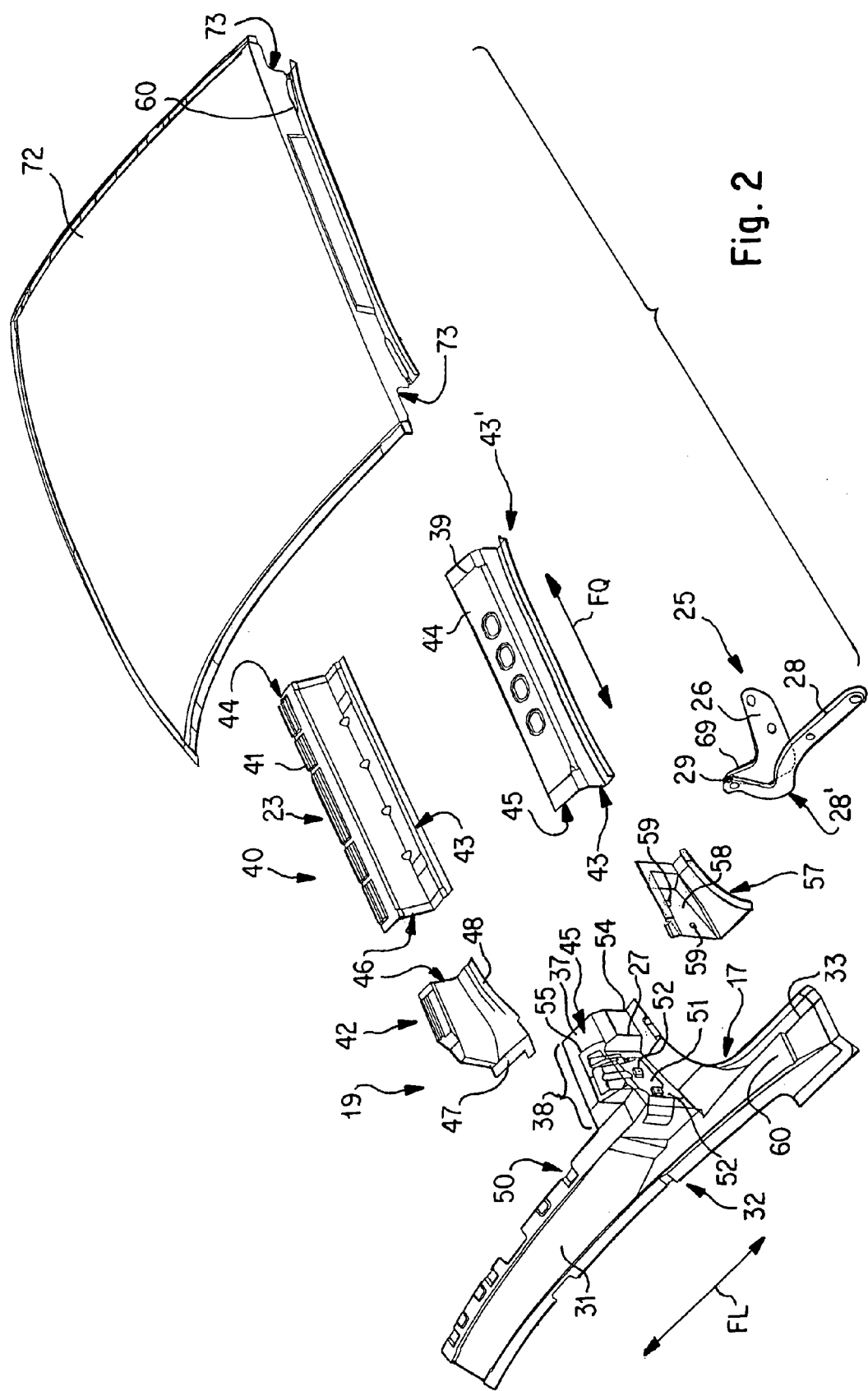
FIG. 2 is an exploded view of the rearward vehicle body structure of FIG. 1 in the area of a roof junction.

The roof junction 19 is further explained by means of FIGS. 2 to 4: The roof side member 22, the transversely extending roof frame 23 and the rear column 24 are each constructed in a sheet metal shell construction and each have at least an exterior wall and an interior wall. The exterior wall of the roof side member 22 is formed by an outer panel 30, which may be a component of the side wall 5; and a roof side member extension 31 of an interior side part 32 forms the interior wall of the roof side member 22. The interior side part 32 also has a column extension 33 as an interior wall of the rear column 24; the exterior wall of the column 24 is formed by an outer panel 34 which may be a component of the side wall 5. The two outer panels 30 and 34 are preferably constructed in one piece and, in addition, can be implemented in one piece with the other parts 35 and 36 of the side wall 5. These parts 35 and 36 may, for example, be a rearward fender and an outer panel of the vehicle side member.

As mentioned above, the two extentions 31 and 33 form interior walls of the roof side member 22 and of the rear column 24. Another extension of the interior side part 22 is constructed as a roof frame extension 37 and forms a section 38 of the exterior wall of the rearward transversely extending roof frame 23. For the continuation of the exterior wall, the roof frame extension 37 is adjoined by an exterior part 39 of the roof frame, which exterior part 39 extends to an interior side part of the right roof junction 20 not illustrated in FIG. 2, and is connected with its roof frame continuation. For the interior wall of the rearward roof frame 23, an interior roof frame part 40 is provided which may be composed of a center part 41 and of a lateral closing part 42. The center part 41 and the exterior roof frame part 39 are mutually connected. A lateral closing part 42 is assigned to the roof frame extension 37 of the interior side part 32 and lengthens the center part 41. An additional lateral closing part, which is not shown here, is provided for the right roof junction 20.

The exterior roof frame part 39 and the center part 41 are firmly connected with one another by way of strip-shaped pairs of joining surfaces 43 and 44 which extend in the transverse direction FQ of the vehicle. By way of another pair of joining surfaces 45, which also has a strip-shaped construction but extends in the longitudinal direction FL of the vehicle, the exterior roof frame part 39 is connected with the roof frame extension 37. Another strip-shaped pair of joining surfaces 46, which extends in the longitudinal direction FL of the vehicle, connects the lateral closing part 42 with the center part 41. In addition, the closing part 42 is connected by way of strip-shaped additional joining surfaces 47 and 48 with an interior surface 50 of the interior side part 32 facing the vehicle interior 49 (see FIG. 1). In this case, the joining surface 47 is constructed in a strip shape extending approximately in the longitudinal direction FL of the vehicle, and the joining surface 48 is constructed in a strip shape extending approximately in the transverse direction FQ of the vehicle. Thus, the roof frame 23, which as a whole is constructed as a hollow profile, extends with its interior roof frame part 40 to the roof side member extension 31 and, in particular, is fastened thereto by way of the closing part 42.

For the hinge connection 27, a hinge reinforcement 51 is provided which is assigned, particularly fastened, to the interior surface 50 of the interior side part 32 and is covered by the closing part 42. The hinge reinforcement 51 is fastened in the area of the roof frame extension 37 to the interior surface 50 and thus reinforces the roof frame extension 37 for the fastening of the hinge device 25. The hinge reinforcement 51 has an approximately plate-shaped construction and has at least one fastening element 52 for the hinge device 25. The hinge reinforcement 51 has a length measured in the transverse direction FQ of the vehicle which preferably is shorter than the length of the roof frame extension 37 measured in the transverse direction FQ of the vehicle. Furthermore, the plate-shaped hinge reinforcement 51 also has a first lug-type extension 53 which is fastened to the interior side 50 of the side part 32 to its roof side member extension 31. In the cross-sectional views, the roof frame extension 37 has at least two legs 54 and 55 extending at an angle to one another, the plate-shaped hinge reinforcement 51 being assigned to leg 54. A second lug-type extension 56 of the hinge reinforcement 51 is fastened to the interior side 50 of the leg 55 of the roof frame extension 37. The hinge connection 27 is completed by a corner part 57 which is placed on the leg 54 of the roof frame extension 37 and which has a set-back stop surface 58 for the fitting part 26 of the hinge device 25. Corresponding openings 59 are also provided in the stop surface 58 which correspond with the fastening elements 52 of the hinge reinforcement 51. The hinge device 25 can be securely held on the hinge connection 27, for example, by means of screws which are not shown here.

As illustrated in FIG. 4, the vehicle body shell cutout 9 for the tailgate 10 is at least partially surrounded by a so-called sealing duct 60 in which water which has entered can be guided to a suitable discharge point. The sealing duct 60 bounding the vehicle body shell cutout 9 is further developed as a profile, particularly a U-profile, which is open in the upward direction, and has a sealing duct part 61 which is constructed as a sheet metal part and has a bent-away flange 62 onto which a seal 63 is placed. This sealing duct part 61 rests on the column extension 33 of the interior side part 32 and can be fixedly connected by means of its flange 62 with the side part 32. By means of its end 64 situated opposite the flange 62, the sealing duct part 61 is connected with the exterior wall of the column 24, the sealing duct part 61 extending at least by means of an upright section 65 having the end 64 beyond the roof junction 19 into the roof side member 22, which is illustrated in FIG. 3. This section 65 is preferably connected with the interior side part 32 in the area of the roof side member extension 31. As further illustrated in FIG. 3, the upright section 65 is also adjoined by a roof section 66 which by means of its end in a connection section 67 is connected with the interior side part 32, the side wall 5 forming the skin and possibly with the roof 8. A pocket 68 is formed between the interior side part 32 or its roof side member extension 31 and the upright section 65, into which pocket 68 the hinge device 25 can be immersed at least partially. This applies particularly to the curved section 28' of the fitting part 28 or of the bent-away section 69 of the fitting part 26 carrying the hinge axis 29.

As illustrated in FIGS. 3 and 4, a reinforcing part 70 constructed as a sheet metal part is also situated within the roof side member 22 and the rear column 24, which reinforcing part 70 is adapted in its cross-section approximately to the cross-section of the exterior wall of the roof side member 22 or of the column 24. The reinforcing part 70 is thereby situated within the exterior wall and the interior wall which is formed for the column 24 as well as for the roof side member 22 by the interior side part 32. By means of one end, the reinforcing part 70 is connected with the upright section 65 of the sealing duct part 61; by means of the other end, the reinforcing part 70 in a connection section 71 is firmly integrated between the interior side part 32 and the exterior wall of the roof side member 22 or the column 24. As a result of the reinforcing part 70 which therefore extends inside the column 24 as well as inside the roof side member 22; the upright section 65 of the sealing duct part 61 which extends from the area of the column 24 into the roof side member 22; as well as the exterior wall of the column 24 or the roof side member 22 and the interior side part 32, a high stiffness is therefore achieved in the area of the roof junction 19. The stiffness in the roof junction 19 is significantly determined by the roof frame extension 37 of the interior side part 32 which extends diagonally through the roof junction 19 because it originates from the extensions 31 and 33 of the side part 32 forming the respective interior walls and forms the section 38 of the exterior wall of the rearward, transversely extending roof frame 23.

FIG. 2 also shows in the corner area 17 that the corner part 57 is partially a component of the sealing duct 60. The same applies to a bent-away section 43' on the exterior roof frame part 39, which bent-away section 43' has a joining surface of the pair 43 of joining surfaces. The composite roof junction 19 and 20 respectively is covered by a fitted-on roof plate 72 which laterally in the connection area 67 is connected with the roof side member 22 and, in addition, in the area of the rearward roof frame 23, is connected with the exterior roof frame part 39 on its bent-away section 43 carrying the joining surface of the pair of joining surfaces 43. In each case, the roof plate 72 has corner cutouts 73 which leave the hinge connection 27 open.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Rearward body structure of a motor vehicle, having a vehicle body shell cutout for a tailgate attached to the body structure, which body structure has a roof junction assembly in which a lateral roof side member, a transversely extending roof frame with a hinge connection for the tailgate and a rear column converge, the roof side member, the roof frame and the column respectively having a sheet metal shell construction with at least an exterior wall and an interior wall, said roof junction assembly further having an interior side part with a roof side member extension, a roof frame extension, and a column extension, which roof side member extension and column extension each form the respective interior wall, on which roof frame extension a hinge reinforcement of the hinge connection is fastened, wherein the roof frame extension of the interior side part forms a section of the exterior wall of the transversely extending roof frame, wherein the hinge reinforcement is fastened to an interior surface of the roof frame extension, and wherein an interior roof frame part forms the interior wall of the roof frame.

2. Body structure according to claim 1, wherein the roof side member is equipped with an interior reinforcing part situated between the exterior wall and the interior wall.

3. Body structure according to claim 1, wherein the length of the roof frame extension measured in the direction of the transversely extending roof frame is greater than the length of the hinge reinforcement.

4. Body structure according to claim 1, wherein the hinge reinforcement is additionally fastened to the roof side member extension of the interior side part.

5. Body structure according to claim 1, the roof frame extension has at least two legs extending at an angle to one another, and wherein the hinge reinforcement is fastened to both legs.

6. Body structure according to claim 1, wherein the interior roof frame part extends to the roof side member extension and is fastened thereto.

7. Body structure according to claim 6, wherein the interior roof frame part has a center part and a lateral closing part.

8. Body structure according to claim 1, wherein the interior roof frame part has a center part and a lateral closing part.

9. Body structure according to claim 8, wherein the closing part extends to the roof side member extension and is fastened thereto.

10. Body structure according to claim 1, wherein a pocket is formed in the roof side member, into which pocket a hinge device of the tailgate projects at least partially.

11. Body structure according to claim 10, wherein the pocket is laterally bounded in part by the interior side part.

12. Body structure according to claim 1, wherein the rear column at least partially bounds the vehicle body shell cutout by means of a sealing duct.

13. Body structure according to claim 12, wherein the sealing duct has an open profile as a sealing duct part which partially bounds the vehicle body shell cutout by means of a bent-away flange and projects into the roof side member by means of a section.

14. Body structure according to claim 13, wherein the sealing duct part and the column extension of the interior side part are disposed above one another at least in sections.

15. Body structure according to claim 13, wherein the section projecting into the roof side member is connected therein with an interior part and the interior side part.

* * * * *